US007501002B2

(12) United States Patent
Han et al.

(10) Patent No.: US 7,501,002 B2
(45) Date of Patent: Mar. 10, 2009

(54) CYCLONE DUST SEPARATOR AND A VACUUM CLEANER HAVING THE SAME

(75) Inventors: Jung-gyun Han, Busan (KR); Jang-keun Oh, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 540 days.

(21) Appl. No.: 11/245,658

(22) Filed: Oct. 7, 2005

(65) Prior Publication Data

US 2006/0230720 A1 Oct. 19, 2006

(30) Foreign Application Priority Data

Apr. 18, 2005 (KR) ...................... 10-2005-0032073

(51) Int. Cl.
*B01D 45/12* (2006.01)
*B01D 50/00* (2006.01)

(52) U.S. Cl. ............................ 55/309; 55/337; 55/345; 55/459.1; 55/DIG. 3

(58) Field of Classification Search .................. 55/309, 55/337, 345, 459.1, DIG. 3; 15/353
See application file for complete search history.

(56) References Cited

U.S. PATENT DOCUMENTS 7,291,189 B2 * 11/2007 Lim et al. ..................... 55/337
2005/0028675 A1 2/2005 Conrad et al. .................. 96/57

FOREIGN PATENT DOCUMENTS

| | | |
|---|---|---|
| EP | 0018197 | 10/1980 |
| EP | 1488729 | 12/2004 |
| JP | 2004135700 | 5/2004 |
| KR | 1020000067036 | 11/2000 |
| WO | WO2004/049890 | 6/2004 |

OTHER PUBLICATIONS

Office Action dated Nov. 23, 2006 issued from the Russian Patent Office with respect to Russian Patent Application No. 2005133922.
Extended Search Report dated Oct. 8, 2008 corresponding to European Patent Application No. 05292238.2.

* cited by examiner

*Primary Examiner*—Robert A Hopkins
(74) *Attorney, Agent, or Firm*—Ohlandt, Greeley, Ruggiero & Perle, LLP.

(57) ABSTRACT

A cyclone dust separator for a vacuum cleaner, where a couple of cyclones are disposed parallel with each other and sequentially operated to separate and collect dust. The cyclone dust separator includes a bypass path guiding dust-laden air drawn in through a suction opening directly to a motor and having a first mesh that filters off dust included in drawn-in air; a first cyclone disposed at one side of the bypass path to separate the dust from the dust-laden air drawn in through the suction opening and discharge cleaned air to the motor; and a second cyclone disposed parallel with the first cyclone to separate the dust from the dust-laden air drawn in through the suction opening and discharge cleaned air to the motor. The dust included in the air is separated sequentially by the first mesh, the first cyclone and the second cyclone.

17 Claims, 8 Drawing Sheets

CYCLONE DUST SEPARATOR AND A VACUUM CLEANER HAVING THE SAME

CROSS-REFERENCE TO RELATED APPLICATIONS

This application claims benefit under 35 U.S.C. § 119(a) of Korean Patent Application No. 2005-32073, filed Apr. 18, 2005, the entire contents of which are incorporated herein by reference.

BACKGROUND OF THE INVENTION

1. Field of the Invention

The present invention relates to a vacuum cleaner. More particularly, the present invention relates to a cyclone dust separator for a vacuum cleaner.

2. Description of the Related Art

In general, vacuum cleaners perform a cleaning work by driving a motor to generate a suction force for drawing in dust and dirt, separating and collecting the dust and dirt (hereinafter, referred to as 'dust') from dust-laden air using a dust separator, and discharging cleaned air.

Although a variety of methods can be adopted to separate the dust, a cyclone dust separator is widely used nowadays because it is semi-permanent.

The cyclone dust separator forms a whirling current with the dust-laden air so that the dust included in the air is separated by a centrifugal force generated by the whirling current. Cleaned air is discharged to the outside of the vacuum cleaner through the motor, and the separated dust is collected in a dust receptacle formed at a lower part of the cyclone dust separator. When the dust receptacle is filled up with the dust, a user empties the dust receptacle so that the vacuum cleaner is able to work again.

Recently, a double-cyclone dust separator in which a couple of cyclones are serially connected and a multi-cyclone dust separator in which a plurality of sub-cyclones are arranged along a circumference of a main cyclone have been used to enhance dust collecting efficiency. In spite of improved dust collecting efficiency, however, the double-cyclone dust separator and the multi-cyclone dust separator are not satisfactory in view of the suction force due to loss of pressure.

SUMMARY OF THE INVENTION

An aspect of the present invention is to solve at least the above problems and/or disadvantages and to provide at least the advantages described below. Accordingly, an aspect of the present invention is to provide a cyclone dust separator for a vacuum cleaner, capable of realizing an improved suction force as well as high dust collecting efficiency.

Another aspect of the present invention is to provide a convenient cyclone dust separator for a vacuum cleaner, of which replacement cycle of a filter is long and the suction force can be maintained for a long time.

In order to achieve the above-described aspects of the present invention, there is provided a cyclone dust separator for a vacuum cleaner, comprising a bypass path guiding dust-laden air drawn in through a suction opening directly to a motor and having a first mesh that filters off dust included in drawn-in air; a first cyclone disposed at one side of the bypass path to separate the dust from the dust-laden air drawn in through the suction opening and discharge cleaned air to the motor; and a second cyclone disposed parallel with the first cyclone to separate the dust from the dust-laden air drawn in through the suction opening and discharge cleaned air to the motor, wherein the dust included in the air is separated sequentially by the first mesh, the first cyclone and the second cyclone.

A first air inlet of the first cyclone is formed alongside the first mesh. A second air inlet of the second cyclone is formed alongside the suction opening.

The cyclone dust separator further comprises a guide member disposed between the suction opening and the second air inlet of the second cyclone to induce the dust-laden air drawn in through the suction opening first to the first mesh.

Air outlets of the first and the second cyclones are provided with a second mesh and a third mesh, respectively. Here, the first to the third meshes have respectively different sizes of meshes.

The first cyclone has a greater diameter than the second cyclone.

A filter is mounted at air outlets of the bypass path, the first cyclone and the second cyclone.

According to another aspect of the present invention, there is provided a cyclone dust separator for a vacuum cleaner, comprising a bypass path guiding dust-laden air drawn in through a suction opening directly to a motor and having a first mesh that filters off dust included in drawn-in air; a first cyclone disposed at one side of the bypass path and having a first air inlet formed alongside the first mesh to draw in the dust-laden air drawn in through the suction opening, to separate the drawn-in dust and discharge cleaned air to the motor; and a second cyclone disposed parallel with the first cyclone and having a second air inlet formed alongside the suction opening to draw in the dust-laden air drawn in through the suction opening, to separate the drawn-in dust and discharge cleaned air to the motor, wherein the dust included in the air is separated sequentially by the first mesh, the first cyclone and the second cyclone.

The cyclone dust separator further comprises a guide member disposed between the suction opening and the second air inlet of the second cyclone to induce the dust-laden air drawn in through the suction opening first to the first mesh.

Air outlets of the first and the second cyclones are provided with a second mesh and a third mesh, respectively. The first to the third meshes have respectively different sizes of meshes.

The second cyclone is symmetrically disposed with the first cyclone with respect to the bypass path.

Yet another aspect of the present invention is to provide a vacuum cleaner comprising a suction brush; a motor mounted in a main body of the vacuum cleaner to generate a suction force for drawing in dust-laden air through the suction brush; and a cyclone dust separator mounted in the main body to separate and collect dust from the dust-laden air, the cyclone dust separator comprising, a bypass path guiding dust-laden air drawn in through a suction opening directly to a motor and having a first mesh that filters off dust included in drawn-in air; a first cyclone disposed at one side of the bypass path and having a first air inlet formed alongside the first mesh to draw in the dust-laden air drawn in through the suction opening, to separate the drawn-in dust and discharge cleaned air to the motor; and a second cyclone disposed parallel with the first cyclone and having a second air inlet formed alongside the suction opening to draw in the dust-laden air drawn in through the suction opening, to separate the drawn-in dust and discharge cleaned air to the motor, wherein the dust included in the air is separated sequentially by the first mesh, the first cyclone and the second cyclone.

The vacuum cleaner further comprises a guide member disposed between the suction opening and the second air inlet of the second cyclone to induce the dust-laden air drawn in through the suction opening first to the first mesh.

As can be appreciated from the above description of the cyclone dust separator for the vacuum cleaner, according to an embodiment of the present invention, the suction force is applied to the bypass path, the first cyclone, and the second cyclone at the same time. Therefore, the suction force can be improved in comparison with the conventional art where the cyclones are serially arranged. Accordingly, the user can perform the cleaning work with a strong initial suction force.

In addition, because the first mesh, the first cyclone, and the second cyclone operate in order, suction efficiency is improved while the loss of pressure is reduced.

Furthermore, a working period of the vacuum cleaner can be elongated because the first mesh, the first cyclone, and the second cyclone are sequentially operated. Also, since the meshes are blocked in order, replacement cycle of the meshes can be elongated and the suction force can be maintained for a long time.

BRIEF DESCRIPTION OF THE DRAWING FIGURES

The above aspect and other features of the present invention will become more apparent by describing in detail exemplary embodiments thereof with reference to the attached drawing figures, wherein.

DETAILED DESCRIPTION OF THE EXEMPLARY EMBODIMENTS

Figure 1:
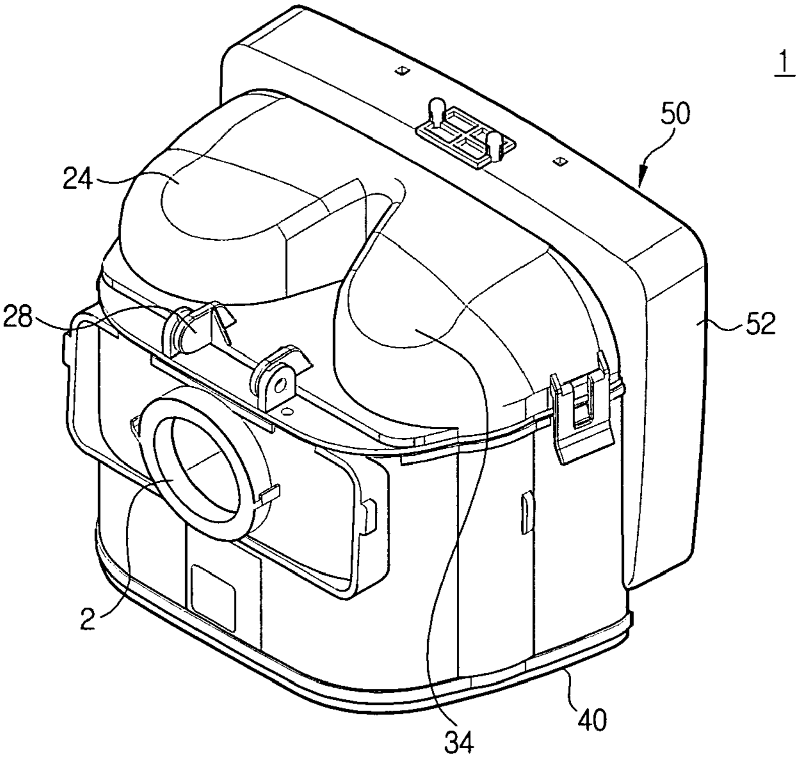
FIG. 1 is a perspective view of a cyclone dust separator for a vacuum cleaner, according to an embodiment of the present invention.
Figure 2:
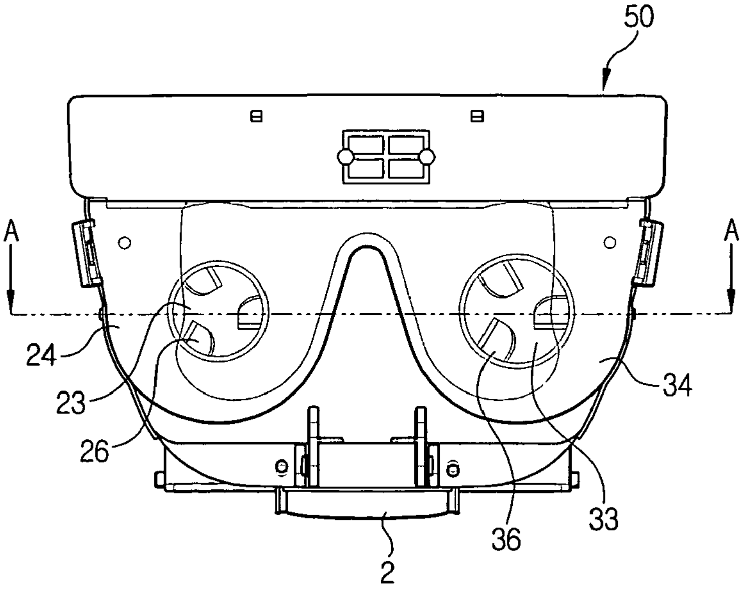
FIG. 2 is a plan view of a cyclone dust separator of FIG. 1.

Hereinafter, certain embodiments of the present invention will be described in detail with reference to the accompanying drawing figures.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Referring to FIGS. 1 to 6, a cyclone dust separator 1 for a vacuum cleaner, according to an embodiment of the present invention, comprises a bypass path 10, a first cyclone 20, and a second cyclone 30.

Figure 4:
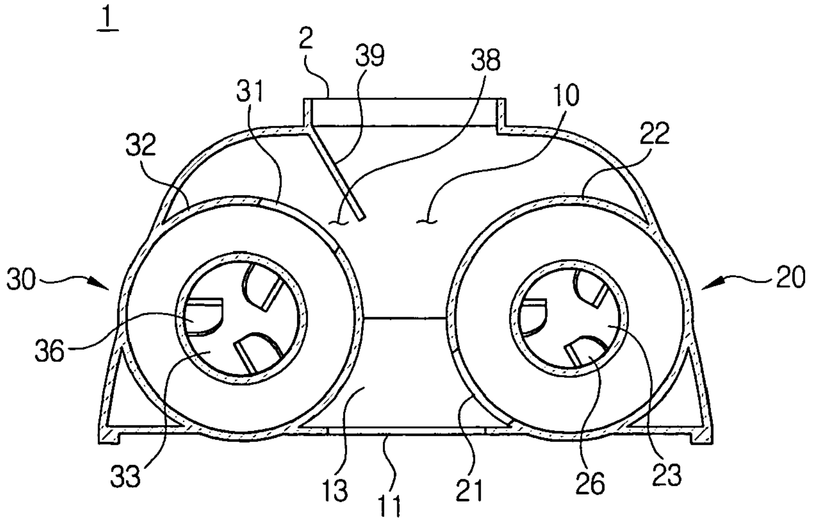
FIG. 4 is a sectional view for illustrating arrangement of a first air inlet, a second air inlet and a guide member in the cyclone dust separator of FIG. 3.
Figure 5:
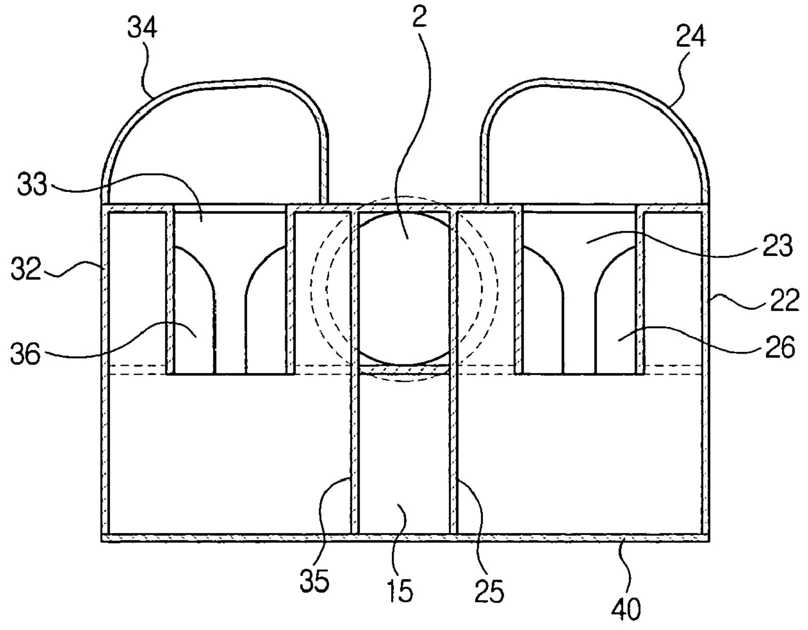
FIG. 5 is a sectional view of FIG. 2 cut away along a line A-A.
Figure 6:
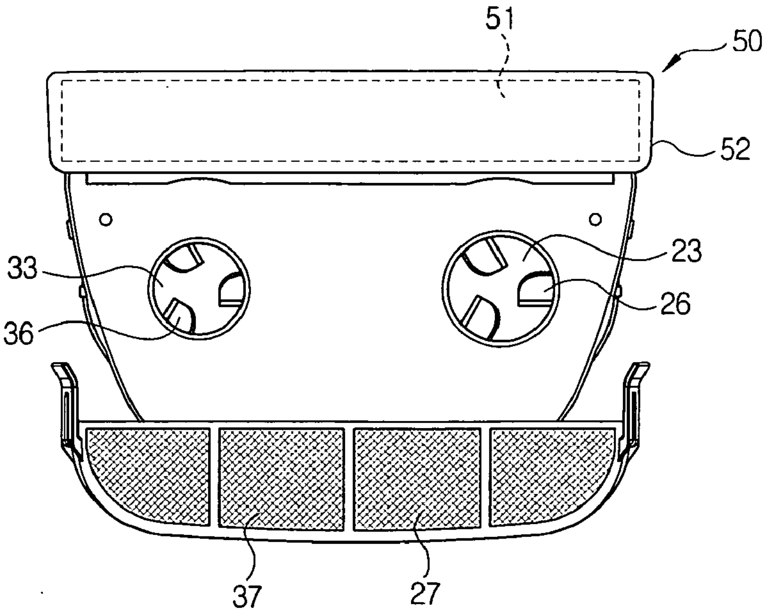
FIG. 6 is a plan view of the cyclone dust separator of FIG. 1 with first and second air outlet covers opened.
Figure 7:
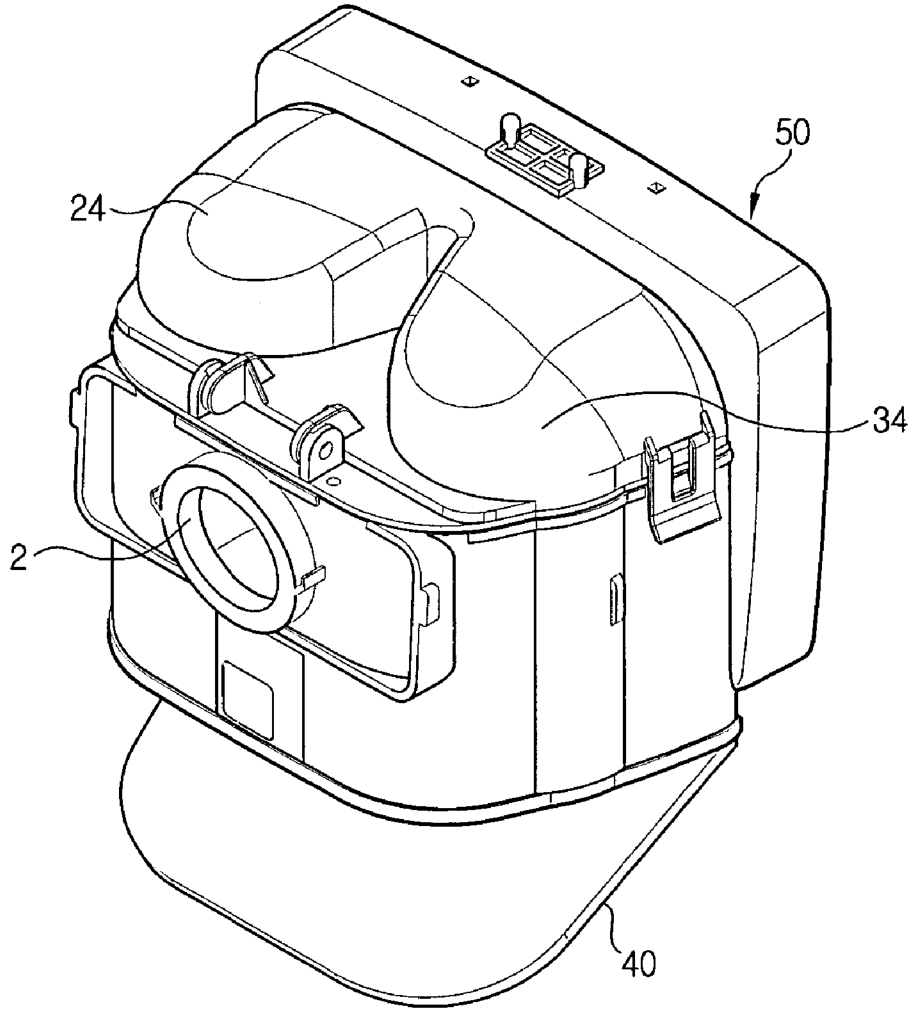
FIG. 7 is a perspective view showing an operation of removing collected dust in the cyclone dust separator of FIG. 1.
Figure 11:
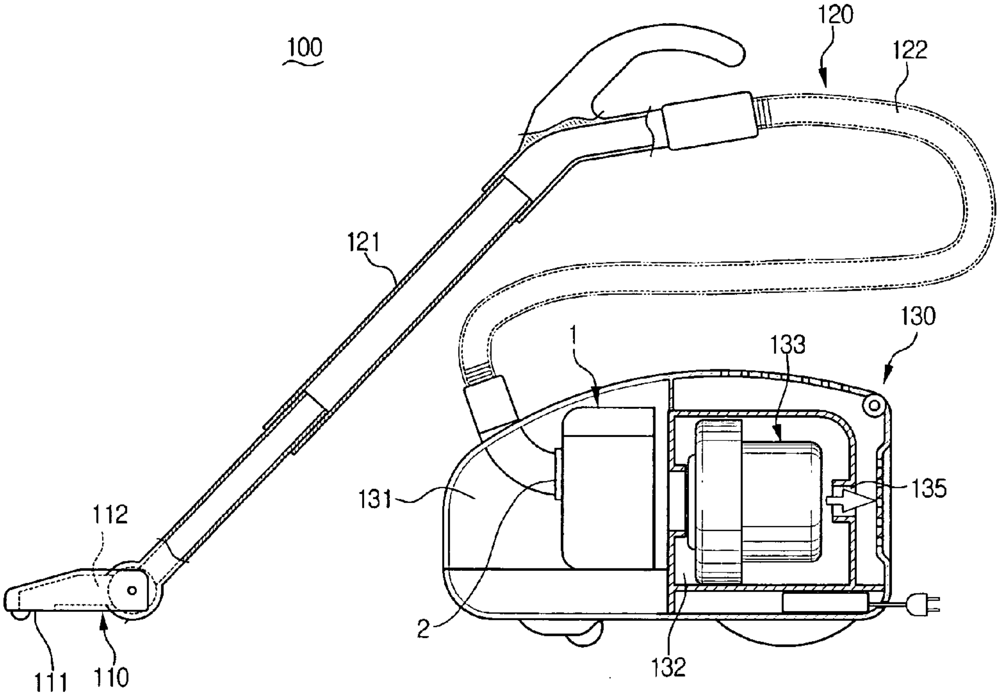
FIG. 11 is a view showing a vacuum cleaner comprising the cyclone dust separator according to an embodiment of the present invention.

The bypass path 10 guides dust-laden air drawn in through a suction opening 2 directly to a motor 133 (FIG. 11). One end of the bypass path 10 is fluidly communicated with the suction opening 2 while the other end is fluidly communicated with a discharge opening 11. The suction opening 2 is fluidly communicated with a suction brush 110 (FIG. 11) while the discharge opening 11 is fluidly communicated with the motor 133. At the discharge opening 11, a first mesh 12, formed as a porous net, is mounted to filter off the dust included in the drawn-in air. When the first mesh 12 is blocked up by the dust, even clean air cannot pass it through. A through-hole 13 is formed in the bypass path 10 in front of the first mesh 12 so that the dust filtered off by the first mesh 12 drops therethrough. A dust receptacle 15 is provided under the bypass path 10 to collect the dust filtered off by the first mesh 12. The bypass path 10 can be structured in various manners as far as the air drawn in through the suction opening 2 can be discharged to the motor 133 by directly passing through the first mesh 12, without passing through the first and the second cyclones 20 and 30. However, as shown in FIG. 4, it is preferable that the suction opening 2 and the discharge opening 11 are aligned with each other and the first and the second cyclones 20 and 30 form sidewalls of the bypass path 10.

The first cyclone 20 is formed at one side of the bypass path 10 to separate and collect the dust from the air drawn in through the bypass path 10 and discharge cleaned air, from which the dust is removed, toward the motor 133. The first cyclone 20 comprises a first air inlet 21, a first cyclone body 22, a first air outlet 23, a first outlet cover 24, and a first dust receptacle 25.

The first air inlet 21 is formed at the first cyclone body 22 alongside the first mesh 12 such that the dust-laden air drawn in through the suction opening 2 flows into the first cyclone 20 when the first mesh 12 is blocked up by the dust. The first cyclone body 22 has a substantially cylindrical form for the dust-laden air drawn through the first air inlet 21 to form a whirling current. The first air outlet 23 is disposed in the center of the first cyclone body 22 so that the air cleaned by the centrifugal force can escape therethrough. The first air outlet 23 has a substantially cylindrical form. Inside the first air outlet 23, a plurality of first upstream dust blocking pieces 26 are formed to remove dust remaining in the air being discharged and prevent the dust from flowing back along the air being discharged. The first upstream dust blocking pieces 26 are preferably formed as spiral slopes. Although not illustrated, a porous grill may be adopted at the first air outlet 23. The first outlet cover 24 is configured to induce the air passed through the first air outlet 23 to the motor 133.

A second mesh 27 is formed at one end of the first outlet cover 24. The second mesh 27, formed as a porous net, filters off the dust that is remaining in the air discharged from the first air outlet 23 and discharges the further cleaned air to the motor 133. Although the second mesh 27 may be formed of the same substance as the first mesh 12, it is preferable that the second mesh 27 has a larger mesh size than the first mesh 12 so that larger dust can pass through the second mesh as compared to the first mesh. More specifically, the second mesh 27 preferably has less number of openings than the first mesh 12 per unit area. Therefore, although the first mesh 12 is blocked, the air can pass through the second mesh 27. Further, the first outlet cover 24 may be detachable with respect to the first cyclone body 22 in order to facilitate replacement of the second mesh 27 in case that the second mesh 27 is also blocked up.

The first dust receptacle 25 is formed under the first cyclone 20 to collect the dust separated by the first cyclone 20. In this embodiment, the first dust receptacle 25 is formed integrally with the first cyclone body 22.

Figure 3:
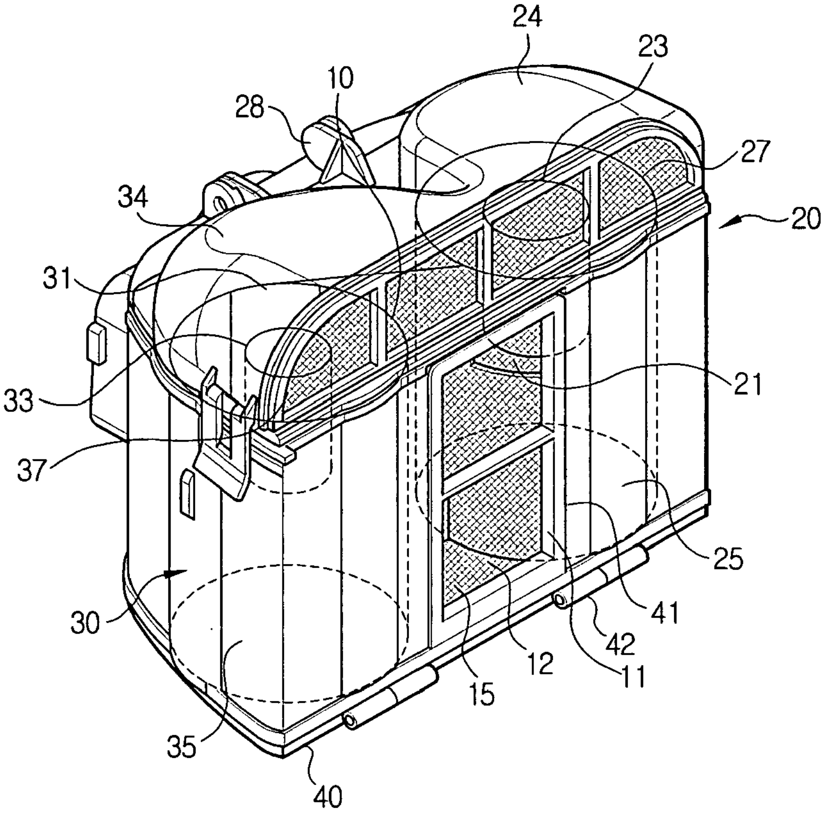
FIG. 3 is a perspective view of the cyclone dust separator with a filter removed.

The second cyclone 30 is formed parallel with the first cyclone 20. The second cyclone 30 separates the dust from the air drawn in through the suction opening 2 and discharges only the cleaned air toward the motor 133. Here, the second cyclone 30 is symmetrically disposed with the first cyclone 10 with respect to the bypass path 10, as shown in FIGS. 3 and 4. The second cyclone 30 comprises a second air inlet 31, a second cyclone body 32, a second air outlet 33, a second outlet cover 34, and a second dust receptacle 35.

The second air inlet 31 is formed at the second cyclone body 32 alongside the suction opening 2 such that the dust-laden air drawn in through the suction opening 2 flows into the second cyclone 30 when the drawn-in air and the dust cannot flow to the first mesh 12 and the first cyclone 20 because the first mesh 12 and the first cyclone 20 are blocked up. Here, a guide member 39 may be provided at a predetermined distance from the second cyclone body 32 between the second air inlet 31 and the suction opening 2. As shown in FIG. 4, the guide member 39 restrains the dust included in the drawn-in air from flowing directly into the second cyclone 30 when the first cyclone 20 is not blocked but allows the dust-laden air drawn in through the suction opening 2 to flow into the second cyclone 30 through the second air inlet 31 when the first mesh 12 and the first cyclone 20 are blocked.

The second cyclone 32 has a substantially cylindrical form for the dust-laden air drawn through the second air inlet 31 to form a whirling current. The second air outlet 33 is disposed in the center of the second cyclone body 32 so that the air cleaned by the centrifugal force can escape therethrough. The second air outlet 33 has a substantially cylindrical form. Inside the second air outlet 33, a plurality of second upstream dust blocking pieces 36 are formed to remove dust remaining in the air being discharged and prevent the dust from flowing back along the air being discharged. The second upstream dust blocking pieces 36 are preferably formed as spiral slopes. Although not illustrated, a porous grill may be adopted at the second air outlet 33. The second outlet cover 34 is configured to induce the air passed through the second air outlet 33 to the motor 133.

A third mesh 37 is formed at one end of the second outlet cover 34. The third mesh 37, formed as a porous net, filters off the dust that is still remaining in the air discharged from the second air outlet 33 and discharges the further cleaned air to the motor 133. Although the third mesh 37 may be formed of the same substance as the second mesh 27, it is preferable that the third mesh 37 has a larger mesh size than the second mesh 27 so that larger dust can pass through the third mesh as compared to the second mesh. More specifically, the third mesh 37 preferably has less number of openings than the second mesh 27 per unit area. Therefore, although the second mesh 27 is blocked, the air can pass through the third mesh 37. Thus, when the third mesh 37 is formed to pass larger dust than the second mesh 27 and the second mesh to pass larger dust than the first mesh 12, although the first and the second meshes 12 and 27 are successively blocked up by the dust, the air can be discharged to the motor 133 through the third mesh 37. Also, for easy replacement of the third mesh 37, the second outlet cover 34 may be detachable with respect to the second cyclone body 32. In addition, the second outlet cover 34 may be mounted separately from the first outlet cover 24; however, the first and the second covers 24 and 34 may be integrally formed and hinged upon the first and the second cyclone bodies 22 and 32, respectively, by a first hinge 28 to be rotatable by a predetermined angle (See FIGS. 3 and 4).

A diameter of the second cyclone 30 is preferably smaller than that of the first cyclone 20. That is, the second cyclone body 32 and the second air outlet 33 are configured to have smaller diameters than the first cyclone body 22 and the first air outlet 23, respectively, because the cyclone having a smaller diameter can catch smaller dust.

The second dust receptacle 35 is formed under the second cyclone 30 to collect the dust separated by the second cyclone 30. In this embodiment, the second dust receptacle 35 is formed integrally with the second cyclone body 32. Also, according to the present embodiment, bottoms of the first and the second dust receptacles 25 and 35, the dust receptacle 15 formed at a lower part of the bypass path 10 are all integrally formed. In other words, a bottom plate 40 of FIG. 3 is bottoms of the first dust receptacle 25, the second dust receptacle 35 and the dust receptacle 15 of the bypass path 10. The bottom plate 40 is mounted by a second hinge 42 on a front wall 41 where the first mesh 12 is mounted. Accordingly, the bottoms of the first and the second dust receptacles 25 and 35 and the dust receptacle 15 of the discharge 10 can be opened by pivoting the bottom plate 40 on the hinge 42 by a predetermined angle, so that the dust collected in the dust receptacles 25, 35 and 15 can be removed. Such hinge structure of the bottom plate 40 is only by way of an example; therefore, the bottom plate 40 may be opened and closed in a sliding manner with respect to the first and the second dust receptacles 25 and 35, and the dust receptacle 15 of the bypass path 10.

Additionally, a filter assembly 50 may be provided between the first, the second and the third meshes 12, 27 and 37 and the motor 133. The filter assembly 50 comprises a micro filter 51 for separating fine dust included in the air that is passed through the first, the second and the third meshes 12, 27 and 37, and a filter housing 52 for supporting the micro filter 51.

Figure 8:
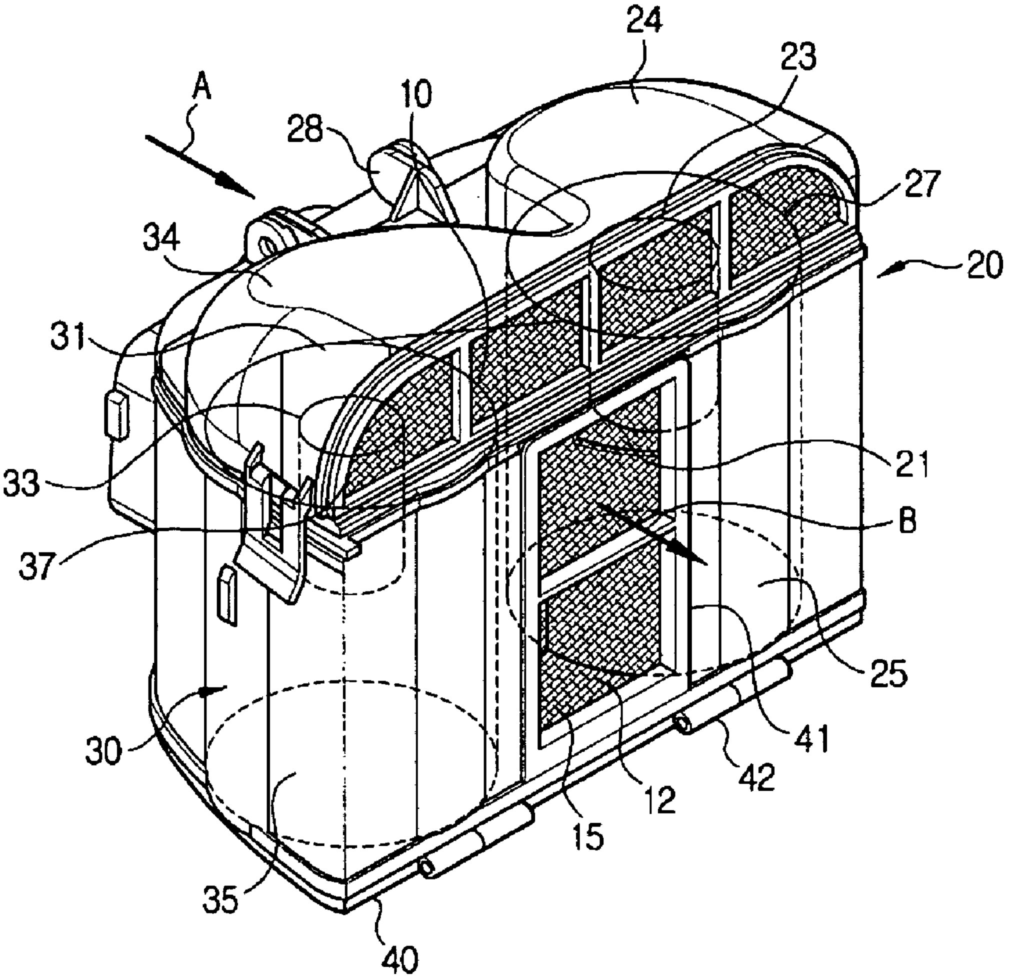
FIG. 8 is a view showing air being discharged at the beginning of a cleaning work in the cyclone dust separator of FIG. 1.

Hereinafter, the operation of the cyclone dust separator 1 for a vacuum cleaner, according to an embodiment of the present invention, will be described with reference to FIGS. 8 to 10.

A suction force is generated by rotation of the motor 133 and applied to the suction opening 2, simultaneously through the first mesh 12, the first cyclone 20, and the second cyclone 30 of the cyclone dust separator 1. Therefore, the dust-laden air is drawn into the cyclone dust separator 1 through the suction brush 110 fluidly communicated with the suction opening 2. Here, since the suction force of the motor 133 is applied simultaneously through the first mesh 12, the first and the second cyclones 20 and 30, the suction efficiency of the vacuum cleaner can be reinforced.

As the dust-laden air enters the suction opening 2, the dust included in the air flows through the bypass path 10 toward the first mesh 12 where the suction force is most strong. This is illustrated by arrow A in FIG. 8. The dust moved to the first mesh 12 is filtered off by the first mesh 12. The filtered-off dust passes through the through-hole 13 and falls down to the dust receptacle 15. The air drawn in together with the dust flows toward the motor 133 through the first mesh 12, the first cyclone 20, and the second cyclone 30. This is illustrated by arrow B in FIG. 8. If the dust is continuously drawn in, the first mesh 12 gets blocked up by the dust. Because the first mesh 12 has smaller openings than the second and the third meshes 27 and 37, the first mesh 12 is more easily blocked than the second and the third meshes 27 and 37.

Figure 9:
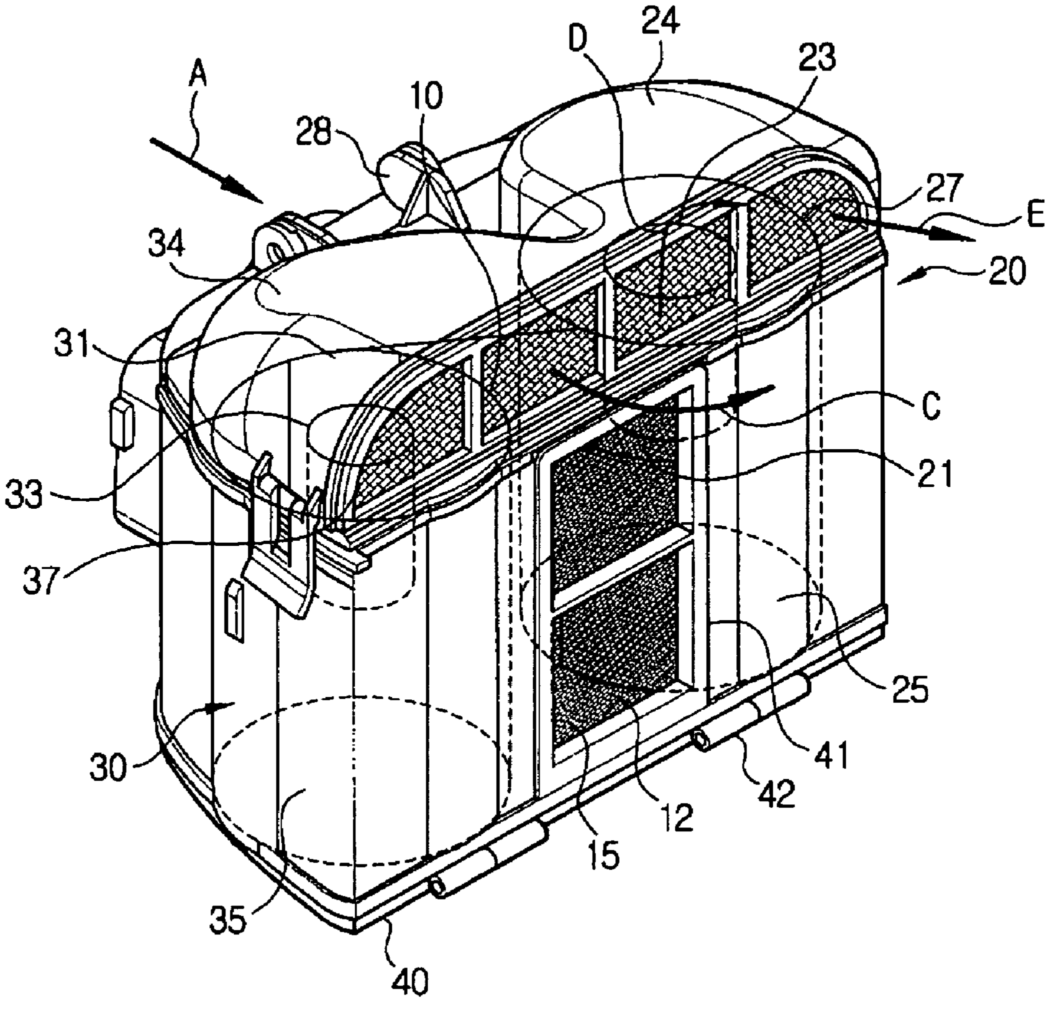
FIG. 9 is a view showing the cyclone dust separator of FIG. 1 collecting the dust by a first cyclone when a first mesh is blocked, in the cyclone dust separator of FIG. 1.

When the first mesh 12 of the bypass path 10 is blocked up, the suction force of the motor 133 is applied mainly through the first cyclone 20, as shown in FIG. 9, because the second mesh 27 is not blocked yet. Accordingly, the dust drawn in with air through the suction opening 2 flows into the first cyclone body 22 through the first air inlet 21 formed on the first cyclone body 22 alongside the first mesh 12. The dust and air that flowed into the first cyclone body 22 forms a whirling current illustrated by arrow C, and the dust included in the air drawn into the first cyclone 20 is separated by the centrifugal force and dropped. The dropping dust is accumulated in the first dust receptacle 25. The air, which is mostly cleaned, ascends through the first air outlet 23 and moves to the first outlet cover 24 as illustrated by arrow D. The dust still remaining in the air after the centrifugal separation and the dust flowing back along the air being discharged are removed by the first upstream dust blocking pieces 26. The air passed through the first air outlet 23 is passed through the first outlet cover 24 and discharged to the second mesh 27. The dust remaining even after passing through the first air outlet 23 is separated by the second mesh 27 as illustrated by arrow E.

Figure 10:
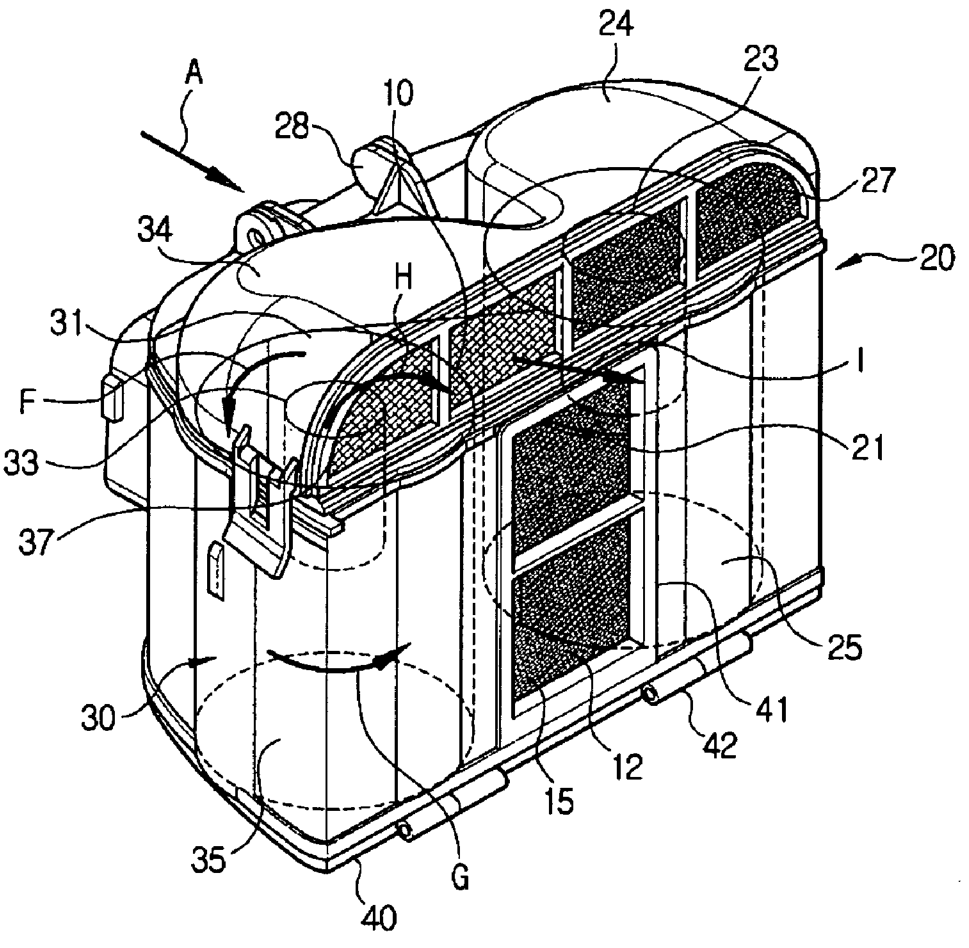
FIG. 10 is a view showing the cyclone dust separator of FIG. 1 collecting the dust by a second cyclone when the first mesh and the first cyclone are blocked, in the cyclone dust separator of FIG. 1.

When the second mesh 27 of the first cyclone 20 is blocked up by the dust as the cleaning work is continued, the suction force of the motor 133 is applied through the second cyclone 30, as shown in FIG. 10. Therefore, the dust drawn in with the air through the suction opening 2 flows along a path 38 (FIG. 4) formed between the guide member 39 and the second cyclone body 32 and is guided into the second cyclone body 32 through the second air inlet 31 as illustrated by arrow F. The dust and air guided into the second cyclone body 32 forms a whirling current as illustrated by arrow G. The dust included in the air drawn into the second cyclone body 32 is separated by the centrifugal force and dropped to the second dust receptacle 35. Since the second cyclone 30 has a smaller diameter than the first cyclone 20, relatively fine dust, which is not separated by the first cyclone 20, can be separated in the second cyclone 30. The air, which is further cleaned, ascends through the second air outlet 33 and moves to the second outlet cover 34 as illustrated by arrow H. The dust still remaining in the air after the centrifugal separation and the dust flowing back along the air being discharged are removed by the second upstream dust blocking pieces 36. The air passed through the second air outlet 33 is passed through the second outlet cover 34 and discharged to the second mesh 37. The dust remaining even after passing through the second air outlet 33 is separated by the third mesh 37 as illustrated by arrow I.

As described above, in the cyclone dust separator 1 according to an embodiment of the present invention, the drawn-in dust is sequentially separated and collected by the first mesh 12, the first cyclone 20, and the second cyclone 30. On the contrary, at the beginning of the cleaning work, the air drawn in together with the dust is discharged through all of the first mesh 12, the first cyclone 20, and the second cyclone 30. When the first mesh 12 is blocked as a predetermined time elapses, the drawn-in air is discharged through the first and the second cyclones 20 and 30. When the first cyclone 20 is also blocked, the air is discharged through only the second cyclone 30.

Thus, in the cyclone dust separator 1 where the first mesh 12, the first cyclone 20, and the second cyclone 30 sequentially operate, loss of the suction force (loss of pressure) can be reduced in comparison with a conventional art. For example, while the loss of pressure at the beginning of the cleaning work is approximately 1.9 inches $H_2O$ (5 millibar, 47 mm $H_2O$) in the cyclone dust separator 1 according to an embodiment of the present invention, the conventional cyclone dust separator loses the pressure of approximately 2.3 inches of $H_2O$ (6 millibar, 58 mm $H_2O$). Further, while the loss of pressure of the embodiment of the present invention, of when the first mesh 12 is blocked, is approximately 7 inches of $H_2O$ (18 millibar, 180 mm $H_2O$), the loss of pressure of the conventional cyclone dust separator in the same case is approximately 25 inches of $H_2O$ (62 millibar, 635 mm $H_2O$).

The air passed through the first mesh 12, the first cyclone 20, and the second cyclone 30 is guided toward the motor 133 through the micro filter 51 and discharged to the outside.

The above-described cyclone dust separator 1 according to an embodiment of the present invention can be applied for various types of vacuum cleaners, such as a canister-type vacuum cleaner and an upright-type vacuum cleaner. FIG. 11 shows the canister-type vacuum cleaner 100 as an example of the vacuum cleaner having the cyclone dust separator 1 of the present invention.

Referring to FIG. 11, the vacuum cleaner 100 comprises the suction brush 110, an extension pipe assembly 120 fluidly connecting the suction brush 110 and the cyclone dust separator 1, and a main body 130 mounting the cyclone dust separator 1.

The suction brush 110 directly contacts with a surface being cleaned and comprises a suction port 111 formed at a lower part thereof to draw in the dust-laden air and a suction passage 112 where the dust-laden air flows.

The extension pipe assembly 120 comprises an extension pipe 121 connected with the suction brush 110 and a flexible hose 122 connected with the extension pipe 121 by one end and connected with the cyclone dust separator 1 in the main body 130 by the other end.

The main body 130 is divided into a dust collecting chamber 131 mounting the cyclone dust separator 1 and a motor chamber 132 mounting the motor 133, which generates the suction force. The cyclone dust separator 1 mounted in the dust collecting chamber 131 includes the bypass path 10 mounting the first mesh 12, and the first and the second cyclones 20 and 30 arranged parallel with each other and sequentially operating. The structure and the operation of the bypass path 10, the first cyclone 20, and the second cyclone 30 are the same as described regarding the previous embodiment.

The dust and air drawn in through the suction port 111 of the suction brush 110, is passed through the extension pipe 121 and the flexible hose 122 and drawn into the suction opening 2 of the cyclone dust separator 1. The drawn-in dust is sequentially separated by the first mesh 12, the first cyclone 20, and the second cyclone 30. Since the operation of separating the dust by the first mesh 12, the first cyclone 20, and the second cyclone 30 has already been described above, it will not be described in detail again. The air passed through the first mesh 12, the first cyclone 20, and the second cyclone 30 flows into the motor chamber 132, passing through the micro filter 51, and is discharged to the outside of the main body 130 through a discharge port 135.

While the invention has been shown and described with reference to certain embodiments thereof, it will be understood by those skilled in the art that various changes in form and details may be made therein without departing from the spirit and scope of the invention as defined by the appended claims.

What is claimed is:

1. A cyclone dust separator for a vacuum cleaner, comprising:

a bypass path guiding dust-laden air drawn in through a suction opening directly to a motor and having a first mesh that filters off dust included in drawn-in air;

a first cyclone disposed at one side of the bypass path to separate the dust from the dust-laden air drawn in through the suction opening and discharge cleaned air to the motor; and a second cyclone disposed parallel with the first cyclone to separate the dust from the dust-laden air drawn in through the suction opening and discharge cleaned air to the motor, wherein the bypass path, the first cyclone, and the second cyclone are sequentially operated.

2. The cyclone dust separator of claim 1, wherein the first cyclone comprises a first air inlet formed alongside the first mesh.

3. The cyclone dust separator of claim 1, wherein the second cyclone comprises a second air inlet formed alongside the suction opening.

4. The cyclone dust separator of claim 3, further comprising a guide member disposed between the suction opening and the second air inlet to induce the dust-laden air drawn in through the suction opening first to the first mesh.

5. The cyclone dust separator of claim 1, wherein the first and the second cyclones comprise an air outlets provided with a second mesh and a third mesh, respectively.

6. The cyclone dust separator of claim 5, wherein the first to the third meshes have respectively different sizes of meshes.

7. The cyclone dust separator of claim 1, wherein the first cyclone has a greater diameter than the second cyclone.

8. The cyclone dust separator of claim 1, further comprising a filter mounted at air outlets of each of the bypass path, the first cyclone, and the second cyclone.

9. A cyclone dust separator for a vacuum cleaner, comprising:

a bypass path guiding dust-laden air drawn in through a suction opening directly to a motor and having a first mesh that filters off dust included in drawn-in air;

a first cyclone disposed at one side of the bypass path and having a first air inlet formed alongside the first mesh to draw in the dust-laden air drawn in through the suction opening, to separate the drawn-in dust and discharge cleaned air to the motor; and a second cyclone disposed parallel with the first cyclone and having a second air inlet formed alongside the suction opening to draw in the dust-laden air drawn in through the suction opening, to separate the drawn-in dust and discharge cleaned air to the motor, wherein the bypass path, the first cyclone, and the second cyclone are sequentially operated.

10. The cyclone dust separator of claim 9, further comprising a guide member disposed between the suction opening and the second air inlet of the second cyclone to induce the dust-laden air drawn in through the suction opening first to the first mesh.

11. The cyclone dust separator of claim 10, wherein the first and the second cyclones comprise air outlets provided with a second mesh and a third mesh, respectively.

12. The cyclone dust separator of claim 11, wherein the first to the third meshes have respectively different sizes of meshes.

13. The cyclone dust separator of claim 9, wherein the second cyclone is symmetrically disposed with the first cyclone with respect to the bypass path.

14. The cyclone dust separator of claim 9, wherein the first cyclone has a greater diameter than the second cyclone.

15. The cyclone dust separator of claim 9, further comprising a filter is mounted at air outlets of the bypass path, the first cyclone and the second cyclone.

16. A vacuum cleaner comprising:

a suction brush;

a motor mounted in a main body of the vacuum cleaner to generate a suction force for drawing in dust-laden air through the suction brush; and a cyclone dust separator mounted in the main body to separate and collect dust from the dust-laden air, the cyclone dust separator comprising, a bypass path guiding dust-laden air drawn in through a suction opening directly to a motor and having a first mesh that filters off dust included in drawn-in air;

a first cyclone disposed at one side of the bypass path and having a first air inlet formed alongside the first mesh to draw in the dust-laden air drawn in through the suction opening, to separate the drawn-in dust and discharge cleaned air to the motor; and a second cyclone disposed parallel with the first cyclone and having a second air inlet formed alongside the suction opening to draw in the dust-laden air drawn in through the suction opening, to separate the drawn-in dust and discharge cleaned air to the motor, wherein the bypass path, the first cyclone, and the second cyclone are sequentially operated.

17. The vacuum cleaner of claim 16, further comprising a guide member disposed between the suction opening and the second air inlet of the second cyclone to induce the dust-laden air drawn in through the suction opening first to the first mesh.

* * * * *